April 9, 1940.   C. E. LOOSE ET AL   2,196,813
ETCHING PRESS
Filed May 25, 1939

INVENTORS.
Clyde E. Loose
Samuel Donovan Swank

ATTORNEY.

Patented Apr. 9, 1940

2,196,813

UNITED STATES PATENT OFFICE 2,196,813

ETCHING PRESS

Clyde E. Loose and Samuel Donovan Swann, Baltimore, Md.

Application May 25, 1939, Serial No. 275,704

3 Claims. (Cl. 101—277)

This invention relates to improvements in portable etching presses and has for its object to provide a device of this character which is simple in construction and easy of operation, and which is designed for the purpose of instruction, entertainment and amusement.

A further object of the invention is to provide an etching press constructed of thin metal which will yield sufficiently to allow the bearings to automatically adjust themselves with respect to the rollers.

A further object of the invention is to provide an etching press in which the roller bearings are self-adjusting to accommodate any unevenness or irregularity in the material passing between the rollers.

A further object of the invention is to provide an etching press that is portable and which can be readily secured to a table, stand, or other article.

The invention consists of the novel construction and arrangement of the parts and combination of parts hereinafter more fully set forth in the following specification, and pointed out in detail in the appended claims.

Figure 1:
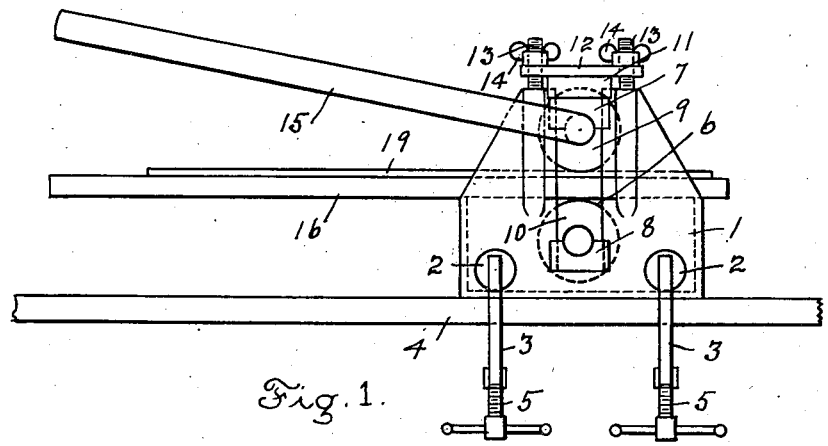
Figure 1 is a side elevation of our invention secured to a table, or stand.
Figure 2:
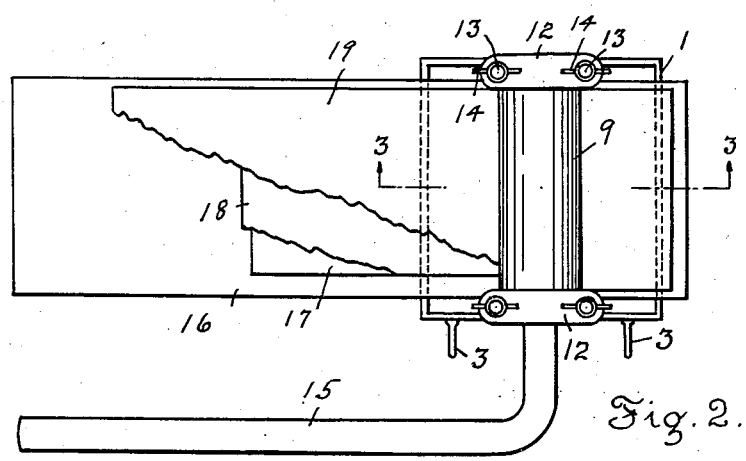
Figure 2 is a plan view of Figure 1 showing the parts on the table, or rest, with the etching pad and paper partly broken away.
Figures 3, 4:
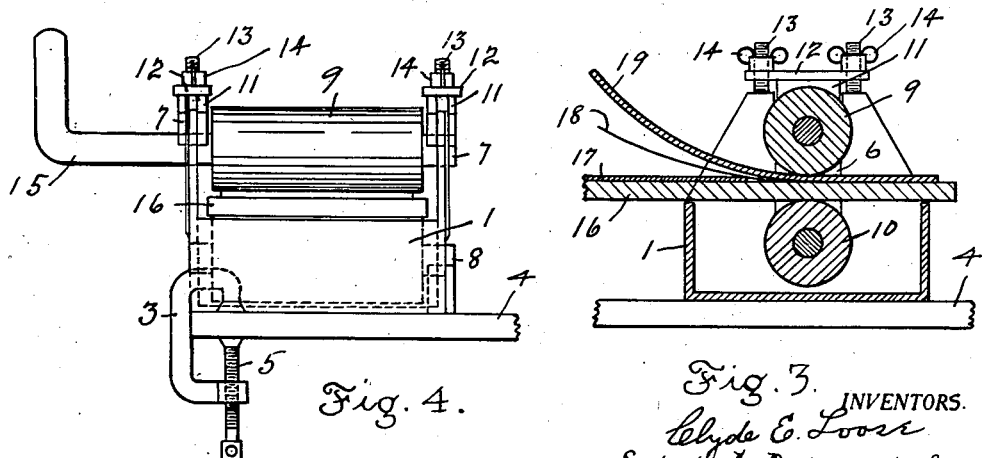
Figure 3 is a section on the line 3—3 of Figure 2.
Figure 4 is an end view of Figure 1.

Referring to the accompanying drawing, forming part of this specification, and in which like reference numerals designate like parts throughout the several views thereof, 1 designates the base of the press which is made of thin sheet metal and which, in the present instance, is square and has two apertures 2 in one side thereof adjacent the bottom of the base into which one end of the clamps 3 project; the other end of the clamps 3 project under the table 4 and are held thereto by the screws 5. The said base 1 projects upwardly on two opposite sides and has two vertical openings at 6 on opposite sides thereof and is provided on each side with bearings 7 and 8 which are slotted in their ends, into which slots the edges of the openings 6 project so that the said bearings 7 and 8 can be raised and lowered in said openings 6. The slots in the ends of the bearings 7 and 8 are sufficiently wide to allow a slight rocking movement to allow the rollers 9 and 10, or either of them, to tilt slightly at either end so they become self-adjusting should the material passing between the rollers be uneven or irregular. The upwardly-projecting sides of the base are sufficiently thin to allow them to yield slightly to strain in order to allow the bearings to adjust themselves with respect to the rollers in the event the slots in the bearings are not sufficiently wide to entirely accomplish the same. The rollers 9 and 10 are held by, and revolve in, the bearings 7 and 8. The lower bearings 8 rest on the thin metal edges at the bottom of the vertical openings 6 which permits them to rock slightly therein to allow the bearings 8 to automatically adjust themselves to the rollers. Resting on the upper bearings 7 are blocks 11 of rubber, or other suitable resilient material, to allow the upper roller 9 to yield as the etching plate passes between the said rollers 9 and 10. Resting on the upper surface of the rubber blocks 11 are plates 12 through which the screws 13 project and are held in position by the thumb nuts 14. The said screws 13 have their inner ends secured on the inner sides of the base 1. The plates 12 can be forced down on the rubber blocks 11 by the thumb nuts 14 to regulate the pressure of the upper roller 9 against the pad and etching plate as they pass between the said rollers. The upper roller 9 is provided with a handle 15 by means of which it is turned. The rest 16 projects between the rollers 9 and 10 and travels back and forth between the rollers as the latter are turned. When the device is to be operated, the etching plate 17, after being properly inked, is placed on the rest 16 and the paper 18 placed on the upper surface of the etching plate 17, and the pad 19 then placed on top of the etching paper. The handle 15 is then turned which carries the rest 16, and consequently, the etching plate, paper, and pad between the rollers 9 and 10, and after passing through said rollers, remain on the rest 16 on the opposite side of the rollers. The printing having been accomplished, the parts are removed from the rest 16 and the operation repeated as often as desired.

Having thus described our invention, what we claim is:

1. An etching press comprising a base, two vertical openings in opposite sides of said base, bearings slidably mounted in said vertical openings and having slots in opposite ends into which the sides of the said vertical slots project, said slots being sufficiently wide to allow a slight rocking motion to said bearings to allow them to become self-adjustable with respect to the rollers mounted therein, two rollers mounted in said bearings, one above the other, and means for revolving said rollers.

2. An etching press comprising a base formed of thin sheet metal and having vertical extensions on two sides opposite each other, and each of said vertical extensions having a vertical opening therein, bearings slidably mounted in said vertical openings and each having a slot in its ends sufficiently large to allow a slight rocking movement thereof to allow the bearings to become self-adjustable with respect to the rollers, two rollers mounted in said bearings, one above the other, and means to revolve said rollers.

3. A portable etching press comprising a base formed of thin sheet metal and having extensions on two sides opposite each other adapted to yield slightly under pressure, each of said vertical extensions having a vertical opening therein, bearings slidably mounted in said vertical openings and each having a slot in its ends sufficiently large to allow a slight rocking movement thereof to allow the bearings to become self-adjustable with respect to the rollers, two rollers mounted in said bearings, one above the other, and means to revolve said rollers.

CLYDE E. LOOSE.
DON SWANN.